(12) United States Patent
Qi et al.

(10) Patent No.: US 11,289,758 B2
(45) Date of Patent: Mar. 29, 2022

(54) PHOTOCATALYTIC POWER GENERATION APPARATUS DEPENDING ON AMBIENT HUMIDITY DIFFERENCE

(71) Applicant: South China University of Technology, Guangdong (CN)

(72) Inventors: Ronghui Qi, Guangdong (CN); Mingming Guo, Guangdong (CN); Lizhi Zhang, Guangdong (CN)

(73) Assignee: South China University of Technology, Guangzhou (CN)

( * ) Notice: Subject to any disclaimer, the term of this patent is extended or adjusted under 35 U.S.C. 154(b) by 42 days.

(21) Appl. No.: 17/066,582

(22) Filed: Oct. 9, 2020

(65) Prior Publication Data

US 2021/0028523 A1     Jan. 28, 2021

Related U.S. Application Data

(63) Continuation of application No. PCT/CN2018/112827, filed on Oct. 30, 2018.

(30) Foreign Application Priority Data

Apr. 9, 2018 (CN) .......................... 201810308788.0

(51) Int. Cl.
*H01M 14/00* (2006.01)
*H01G 9/20* (2006.01)

(52) U.S. Cl.
CPC ........ *H01M 14/005* (2013.01); *H01G 9/2031* (2013.01)

(58) Field of Classification Search
None
See application file for complete search history.

(56) References Cited

U.S. PATENT DOCUMENTS

2013/0014805 A1     1/2013   Vaid et al.

FOREIGN PATENT DOCUMENTS

| CN | 104576068 A | 4/2015 |
| CN | 108667346 A | 10/2018 |
| CN | 208158465 U | 11/2018 |

OTHER PUBLICATIONS

International search report of PCT Patent Application No. PCT/CN2018/112827 dated Jan. 29, 2019.

*Primary Examiner* — Shannon M Gardner (57) ABSTRACT

The present invention relates to a photocatalytic power generation apparatus depending on an ambient humidity difference. The power generation apparatus comprises a photocatalytic power generation unit driven by a humidity difference, a power storage assembly and a sunlight collection and emission assembly. The photocatalytic power generation unit driven by the humidity difference comprises an anode gas channel, a screen type photoelectric anode material, a moisture-permeable proton exchange membrane, a screen type cathode material and a cathode gas channel in sequence from one side to the other side. The photocatalytic power generation unit of the apparatus converts gas humidity difference potential energy in the anode and cathode gas channels into electric energy by a photocatalytic electrochemical reaction under an illumination condition and stores the converted electric energy into the power storage assembly.

10 Claims, 6 Drawing Sheets

PHOTOCATALYTIC POWER GENERATION APPARATUS DEPENDING ON AMBIENT HUMIDITY DIFFERENCE

CROSS REFERENCE TO RELATED APPLICATIONS

The present application is a Continuation Application of PCT Application No. PCT/CN2018/112827 filed on Oct. 30, 2018, which claims the benefit of Chinese Patent Application No. 201810308788.0 filed on Apr. 9, 2018. All the above are hereby incorporated by reference in their entirety.

TECHNICAL FIELD

The present invention relates to the technical field of humidity difference power generation apparatuses, and more particularly, to a photocatalytic power generation apparatus driven by an ambient humidity difference.

BACKGROUND

In the fast-developing world today, with the rapid consumption of non-renewable energy such as coal, oil and natural gas on the earth, energy has become a primary issue that determines development, so that people begin to explore renewable energy such as solar energy, geothermal energy, hydro energy, wind energy, biological energy and ocean energy.

However, in addition to the renewable energy such as biological energy, wind energy and geothermal energy, there is also a kind of energy that has been neglected for a long time. Ambient humidity difference potential energy is also potential renewable energy. The humidity difference widely exists in space and time in a geographical environment, and widely exists in an air conditioning system, so that the ambient humidity difference potential energy is clean and stable energy. For example, in the vast southeastern coastal areas of China, the air humidity is maintained at a fairly high level from March to June every year. To maintain a comfortable indoor living environment, people usually artificially reduce the indoor air humidity. At this time, the humidity difference potential energy exists between indoor air and outdoor air. If the humidity difference potential energy that can be generated is relatively small for family rooms, then the humidity difference potential energy that can be generated during operation is considerable for some large shopping malls, office buildings, factories and engineering projects. Therefore, if the humidity difference potential energy is able to be converted into electric energy for utilization, this newly-added energy utilization mode is expected to alleviate social energy problems.

At present, no one has published a research result about humidity difference power generation. A system using the ambient humidity difference as energy has multiple advantages, such as cleanness, stability, wide source, no space limitation, and difficulty in causing acid and alkali corrosion. Therefore, using the ambient humidity difference resource to generate power can create huge economic benefits, and meanwhile, using clean energy will also contribute to improve and maintain the environmental quality.

As harmless, universal, long-lasting and huge primary energy, solar energy has a great application potential. However, the solar energy is not fully used by the human beings due to technical limitations. In 1967, Professor Fujishima Akira discovered that oxidative decomposition could be promoted by the power of light. Later, it was confirmed that some semiconductor materials (such as titanium dioxide) might undergo electron transition under the irradiation of sunlight, resulting in light-generated electron-hole pairs, which could promote some oxidative decomposition reactions. However, no one has combined the solar energy with the humidity difference to generate power at present.

SUMMARY

An objective of the present invention is to overcome the shortcomings and deficiencies in the prior art, and to provide a photocatalytic power generation apparatus depending on an ambient humidity difference.

The objective of the present invention is achieved by the following technical solutions.

A photocatalytic power generation apparatus depending on an ambient humidity difference comprises a photocatalytic power generation unit driven by a humidity difference, a power storage assembly and a sunlight collection and emission assembly;

the photocatalytic power generation unit driven by the humidity difference comprises an anode gas channel, a screen type photoelectric anode material, a moisture-permeable proton exchange membrane, a screen type cathode material and a cathode gas channel in sequence from one side to the other side; wherein the screen type photoelectric anode material, the moisture-permeable proton exchange membrane and the screen type cathode material together constitute an electrode assembly of the photocatalytic power generation unit;

the anode gas channel and the cathode gas channel are both provided with a gas inlet and a gas outlet; and the gas inlets of the anode gas channel and the cathode gas channel are both provided with a variable frequency fan;

the gas inlet of the anode gas channel is provided with a first air valve and a first temperature-humidity sensor, a first flow sensor is arranged inside the anode gas channel, and the gas outlet of the anode gas channel is provided with a second temperature-humidity sensor;

the gas inlet of the cathode gas channel is provided with a second air valve and a third temperature-humidity sensor, a second flow sensor is arranged inside the cathode gas channel, and the gas outlet of the cathode gas channel is provided with a fourth temperature-humidity sensor;

the screen type photoelectric anode material and the screen type cathode material are both porous screen structures; the screen type photoelectric anode material and the screen type cathode material respectively contain an anode photoelectric catalyst and a cathode catalyst; the screen type photoelectric anode material and the screen type cathode material are connected with the power storage assembly through wires, so that the electric energy generated by the photocatalytic power generation unit is stored in a power storage apparatus in time, and an ammeter and a voltmeter are connected in a connecting circuit; and the sunlight collection and emission assembly is arranged on one side of the photocatalytic power generation unit near the anode gas channel, has a function of collecting sunlight, and is capable of irradiating the collected sunlight on the anode gas channel.

Preferably, a tube wall material of the anode gas channel is a light-permeable insulating and airtight material to ensure that the light emitted by the sunlight collection and emission assembly penetrates through the tube wall of the anode gas channel and irradiates on the screen type photoelectric anode material to generate a photoelectric catalytic reaction.

Preferably, a tube wall material of the cathode gas channel is an insulating and airtight material.

Preferably, the moisture-permeable proton exchange membrane is a high-performance electrolyte membrane with a capability of selectively transmitting water molecules and hydrogen ions simultaneously, comprising a bipolar membrane or an amphoteric membrane; the moisture-permeable proton exchange membrane is prepared by an organic/inorganic nanocomposite method, a catalytic polymerization method or a radiation grairing method.

Preferably, the screen type photoelectric anode material and the screen type cathode material are both prepared by closely attaching anode photoelectric catalyst or cathode catalyst particles to a surface of a metallic screen frame respectively by using a screen printing method, a transfer printing method or a spraying method.

Preferably, the anode photoelectric catalyst is a material with a catalytic photoelectric effect, a semiconductor material comprising $TiO_2$, $ZnO$ or $WO_3$, or a non-semiconductor material comprising a heteropolyacid.

Preferably, the cathode catalyst is a reduction reaction catalyst material capable of catalyzing electrons to react with oxygen and protons to generate water, and comprises noble metals Pt, Ir or Ru, or an alloy, a phosphide, a carbide or a load of one or more of the noble metals Pt, Ir and Ru.

Preferably, pipeline shapes of the anode gas channel and the cathode gas channel are prismatic, non-prismatic, vertical or curved.

Preferably, the sunlight collection and emission assembly is an assembly which is provided with reflection and refraction members, has a structure comprising a plane, a curved surface or a sawtooth surface, and is capable of collecting sunlight from an ineffective area to an effective area.

Preferably, a connected interface between the screen type photoelectric anode material and the moisture-permeable proton exchange membrane and a connected interface between the screen type cathode material and the moisture-permeable proton exchange membrane are both provided with a closely contacted point; when high humidity air is introduced into the anode gas channel and low humidity air is introduced into the cathode gas channel, the high humidity air in the anode gas channel approaches the contact point through an anode side porous screen structure, and under the irradiation of sunlight, water vapor in the air is photolyzed under an action of the anode photoelectric catalyst on the anode side porous screen structures to produce protons; meanwhile, the protons hydrate with water molecules in wet air at the anode side to form hydronium ions; at the same time, low humidity air is introduced into the cathode gas channel and the moisture-permeable proton exchange membrane generates a humidity difference from a high humidity side to a low humidity side, and the hydronium ions pass through the moisture-permeable proton exchange membrane and move to the cathode side under the drive of the humidity difference; directional movement of the hydronium ion makes electrons produced by a photocatalytic reaction move correspondingly to produce a current and generate a power generation effect; while the electrons on the cathode side react with the protons and oxygen to generate water.

The gas humidity in the anode side channel is higher than that in the cathode side channel, and the humidity difference potential energy between the two is converted into electric energy and stored in the power storage apparatus.

More preferably, the air flows in the anode gas channel and in the cathode gas channel in a concurrent flow mode, a countercurrent flow mode or a cross flow mode.

Preferably, one or more than one photocatalytic power generation unit driven by the humidity difference are provided, and the multiple photocatalytic power generation units driven by the humidity difference are combined in a series mode, a parallel mode, a cascade mode, a combined mode or a multistage mode.

A catalytic power generation principle of the apparatus of the present invention is as follows:

when the sunlight irradiates one side of the anode gas channel, under the action of the sunlight, the electrons of the photoelectric catalyst in a catalytic layer of the screen type photoelectric anode material are excited to generate light-generated electron-hole pairs; wherein the light-generated electrons are $e^-$ and the light-generated holes are $h^+$; the light-generated holes $h^+$ are enriched on the catalytic material, and contact with the water molecules in the wet air on the anode side, to generate an oxidation reaction of $2H_2O + 4h^+ \rightarrow 4H^+ + O_2$. That is, under the oxidation of the light-generated holes $h^+$, the water molecules are oxidized to produce hydrogen ions and oxygen. The generated $H^+$ hydrates with the water molecules in the wet air at the anode side to generate hydronium ions, which pass through the moisture-permeable proton exchange membrane under a driving force of the gas humidity difference between the cathode and the anode and move to the cathode side. The generated light-generated electrons $e^-$ are transferred to the cathode side through an external circuit, a reduction reaction of $4H^+ + O_2 + 4e^- \rightarrow 2H_2O$ occurs at the cathode side, and the generated water is taken away by dry air at the cathode side. Therefore, an effective current is generated in the circuit.

Compared with the prior art, the present invention has the following advantages and beneficial effects.

The photocatalytic power generation apparatus depending on the ambient humidity difference according to the present invention uses the humidity difference as a raw material, and is driven by solar energy. The raw material is wide in source, and is also clean and sustainable; meanwhile, the apparatus is simple and compact, safe and reliable, without a moving member and a fixed device, and thus is simple to manufacture. In addition, the apparatus has no corrosion, bubble blockage and other problems, and has theoretical and practical feasibility.

DETAILED DESCRIPTION

The following clearly and completely describes the technical solutions in the embodiments of the present invention with reference to the specific embodiments and the accompanying drawings, but the scope of protection and implementation of the present invention are not limited thereto. Apparently, the described embodiments are merely some but not all of the embodiments of the present invention. Based on the following embodiments, all other embodiments obtained by those of ordinary skills in the art without going through any creative work shall fall within the scope of protection of the present invention.

In a specific embodiment, a photocatalytic power generation apparatus depending on an ambient humidity difference comprises a photocatalytic power generation unit driven by a humidity difference, a power storage assembly 5 and a sunlight collection and emission assembly 4.

Figure 1:
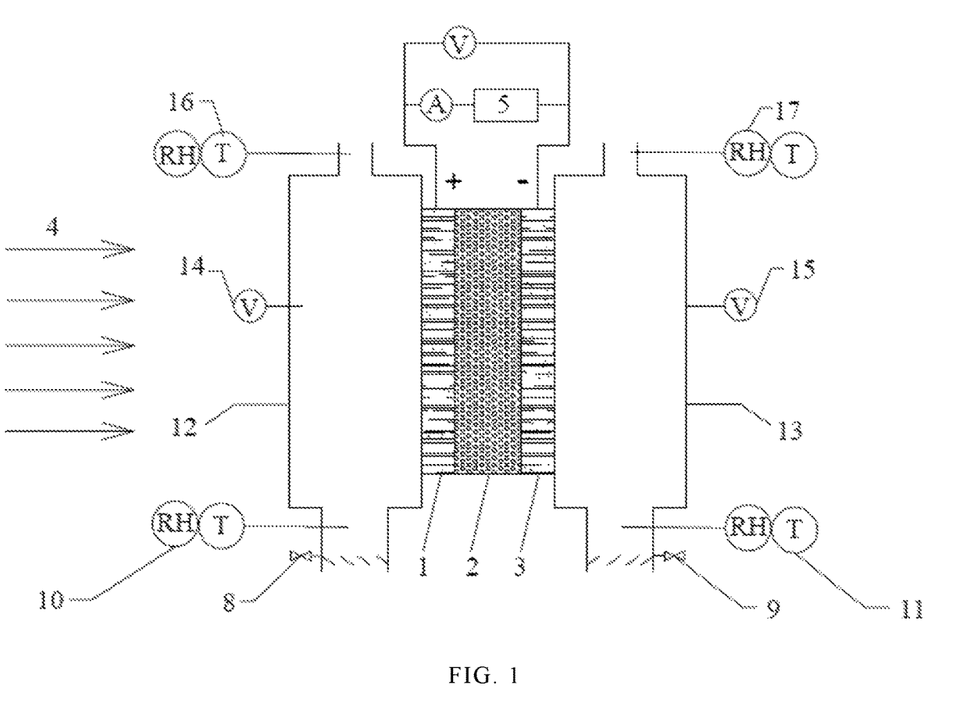
FIG. 1 is a structure diagram of a photocatalytic power generation unit based on a photocatalytic power generation apparatus depending on an ambient humidity difference in a specific embodiment.

The photocatalytic power generation unit driven by the humidity difference comprises an anode gas channel 12, a screen type photoelectric anode material 1, a moisture-permeable proton exchange membrane 2, a screen type cathode material 3 and a cathode gas channel 13 in sequence from one side to the other side, and a structure diagram is shown in FIG. 1.

Figure 2:
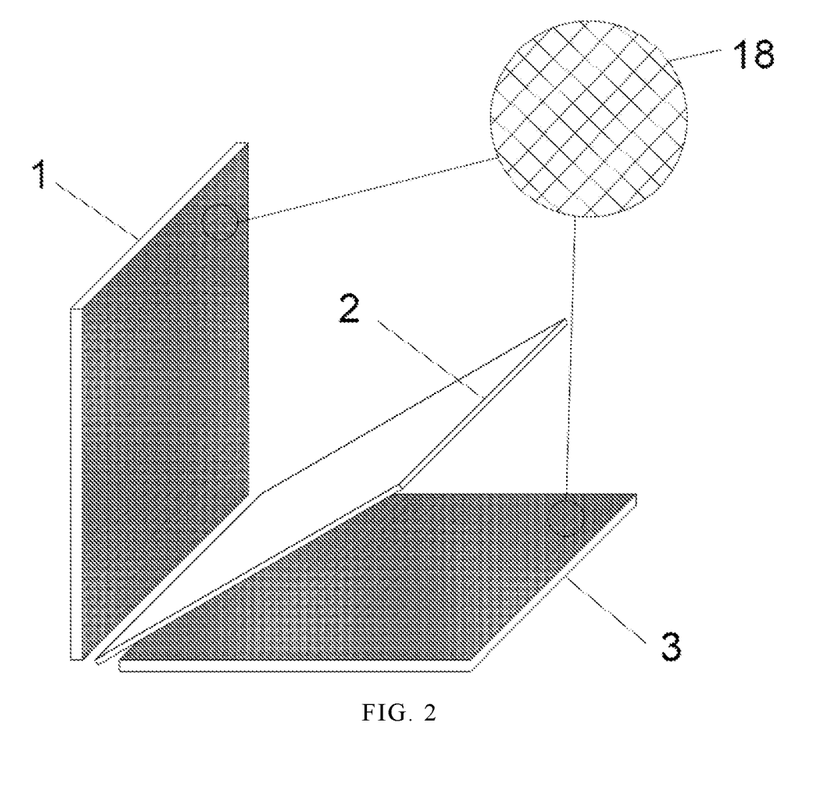
FIG. 2 is a structure diagram of an electrode assembly of the photocatalytic power generation apparatus depending on the ambient humidity difference in the specific embodiment.

The screen type photoelectric anode material 1, the moisture-permeable proton exchange membrane 2 and the screen type cathode material 3 together constitute an electrode assembly of the photocatalytic power generation unit, and a structure diagram is shown in FIG. 2. The screen type photoelectric anode material 1 and the screen type cathode material 3 are both porous screen structures (as shown in 18 of FIG. 2). The screen type photoelectric anode material 1 and the screen type cathode material 3 respectively contain an anode photoelectric catalyst and a cathode catalyst.

The screen type photoelectric anode material 1 and the screen type cathode material 3 are both prepared by closely attaching anode photoelectric catalyst or cathode catalyst particles to a surface of a metallic screen frame respectively by using a screen printing method, a transfer printing method or a spraying method. The employed anode photoelectric catalyst is a material with a catalytic photoelectric effect, a semiconductor material comprising $TiO_2$, $ZnO$ or $WO_3$, or a non-semiconductor material comprising a heteropolyacid. The employed cathode catalyst is a reduction reaction catalyst material capable of catalyzing electrons to react with oxygen and protons to generate water, and comprises noble metals Pt, Ir or Ru, or an alloy, a phosphide, a carbide or a load of one or more of the noble metals Pt, Ir and Ru.

The screen type photoelectric anode material 1 and the screen type cathode material 3 are connected with the power storage assembly 5 through wires, and an ammeter and a voltmeter are connected in a connecting circuit.

The moisture-permeable proton exchange membrane 2 is a high-performance electrolyte membrane with a capability of selectively transmitting water molecules and hydrogen ions simultaneously, comprising a bipolar membrane or an amphoteric membrane. A connected interface between the screen type photoelectric anode material 1 and the moisture-permeable proton exchange membrane 2 and a connected interface between the screen type cathode material 3 and the moisture-permeable proton exchange membrane 2 are both provided with a closely contacted point.

The anode gas channel 12 and the cathode gas channel 13 are both provided with a gas inlet and a gas outlet. The gas inlets of the anode gas channel 12 and the cathode gas channel 13 are both provided with a variable frequency fan. A tube wall material of the cathode gas channel 12 is a light-permeable insulating and airtight material. A tube wall material of the cathode gas channel 13 is an insulating and airtight material. Pipeline shapes of the anode gas channel 12 and the cathode gas channel 13 are prismatic, non-prismatic, vertical or curved.

The gas inlet of the anode gas channel 12 is provided with a first air valve 8 and a first temperature-humidity sensor 10, a first flow sensor 14 is arranged inside the anode gas channel 12, and the gas outlet of the anode gas channel 12 is provided with a second temperature-humidity sensor 16.

The gas inlet of the cathode gas channel 13 is provided with a second air valve 9 and a third temperature-humidity sensor 11, a second flow sensor 15 is arranged inside the cathode gas channel 13, and the gas outlet of the cathode gas channel 13 is provided with a fourth temperature-humidity sensor 17.

Figure 3:
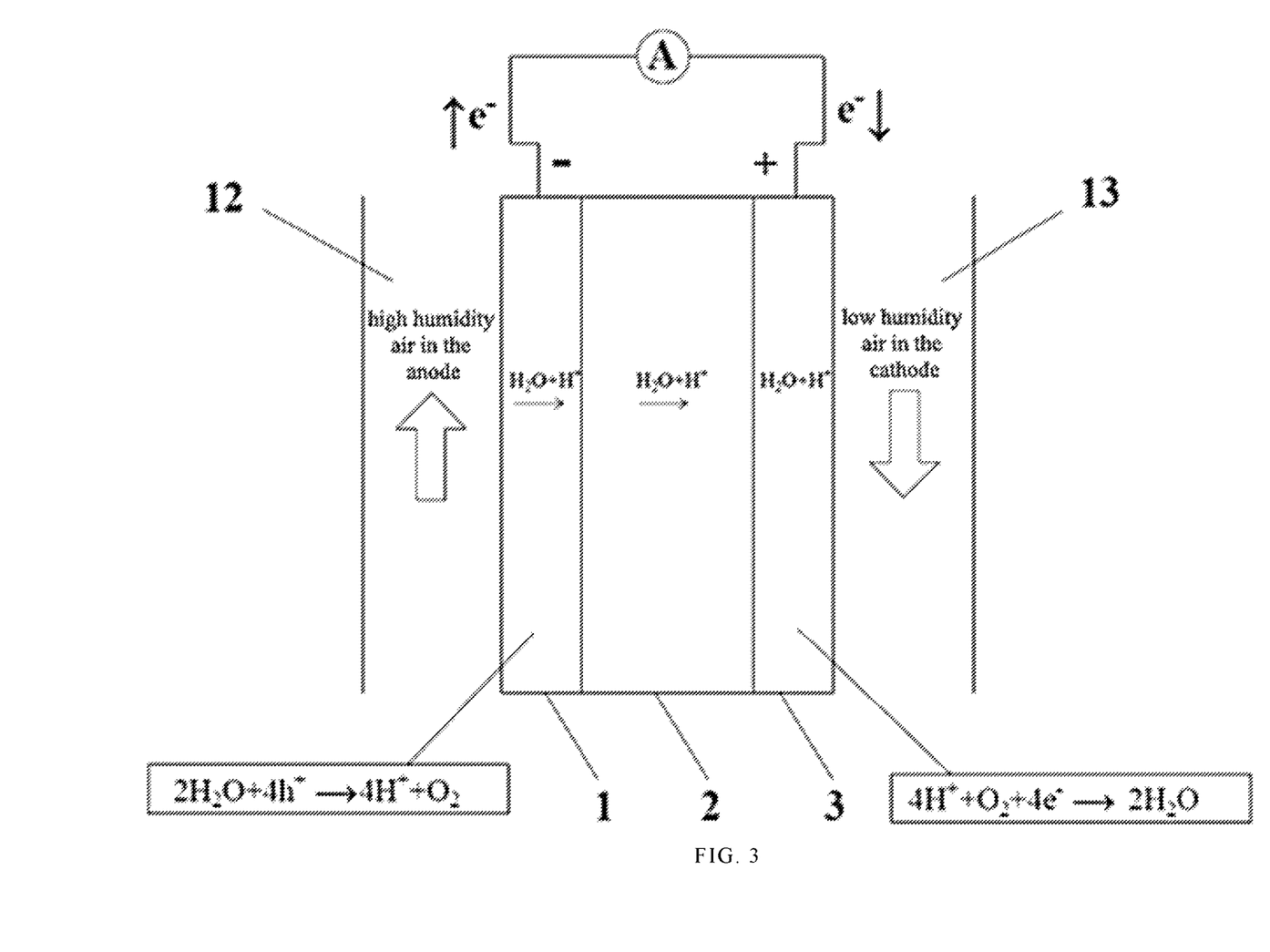
FIG. 3 is a schematic diagram of a working principle of the photocatalytic power generation unit based on the photocatalytic power generation apparatus depending on the ambient humidity difference in the specific embodiment.

A schematic diagram of a working principle of the photocatalytic power generation unit is shown in FIG. 3. When the sunlight irradiates one side of the anode gas channel, under the action of the sunlight, the electrons of the photoelectric catalyst in a catalytic layer of the screen type photoelectric anode material are excited to generate light-generated electron-hole pairs. wherein the light-generated electrons are $e^-$ and the light-generated holes are $h^+$; the light-generated holes $h^+$ are enriched on the catalytic material, and contact with the water molecules in the wet air on the anode side, to generate an oxidation reaction of $2H_2O + 4h^+ \rightarrow 4H^+ + O_2$. That is, under the oxidation of the light-generated holes $h^+$, the water molecules are oxidized to produce hydrogen ions and oxygen. The generated $H^+$ hydrates with the water molecules in the wet air at the anode side to generate hydronium ions, which pass through the moisture-permeable proton exchange membrane 2 under a driving force of the gas humidity difference between the cathode and the anode and move to the cathode side. The generated light-generated electrons $e^-$ are transferred to the cathode side through an external circuit, a reduction reaction of $4H^+ + O_2 + 4e^- \rightarrow 2H_2O$ occurs at the cathode side, and the generated water is taken away by dry air at the cathode side. Therefore, an effective current is generated in the circuit.

When the apparatus is running, high humidity air is introduced into the anode gas channel 12, while low humidity air is introduced into the cathode gas channel 13, the high humidity air in the anode gas channel 12 approaches the contact point through an anode side porous screen structure. Under the irradiation of sunlight, water vapor in the air is photolyzed under an action of the anode photoelectric catalyst on the anode side porous screen structures to produce protons. Meanwhile, the protons hydrate with water molecules in wet air at the anode side to form hydronium ions. At the same time, low humidity air is introduced into the cathode gas channel 13, and the moisture-permeable proton exchange membrane 2 generates a humidity difference from a high humidity side to a low humidity side, and the hydronium ions pass through the moisture-permeable proton exchange membrane 2 and move to the cathode side under the drive of the humidity difference. Directional movement of the hydronium ion makes electrons produced by a photocatalytic reaction move correspondingly to produce a current and generate a power generation effect; while the electrons on the cathode side react with the protons and oxygen to generate water. The air flows in the anode gas channel 12 and in the cathode gas channel 13 in a concurrent flow mode, a countercurrent flow mode or a cross flow mode.

One or more than one photocatalytic power generation unit driven by the humidity difference are provided, and the multiple photocatalytic power generation units driven by the humidity difference are combined in a series mode, a parallel mode, a cascade mode, a combined mode or a multistage mode.

Figure 4:
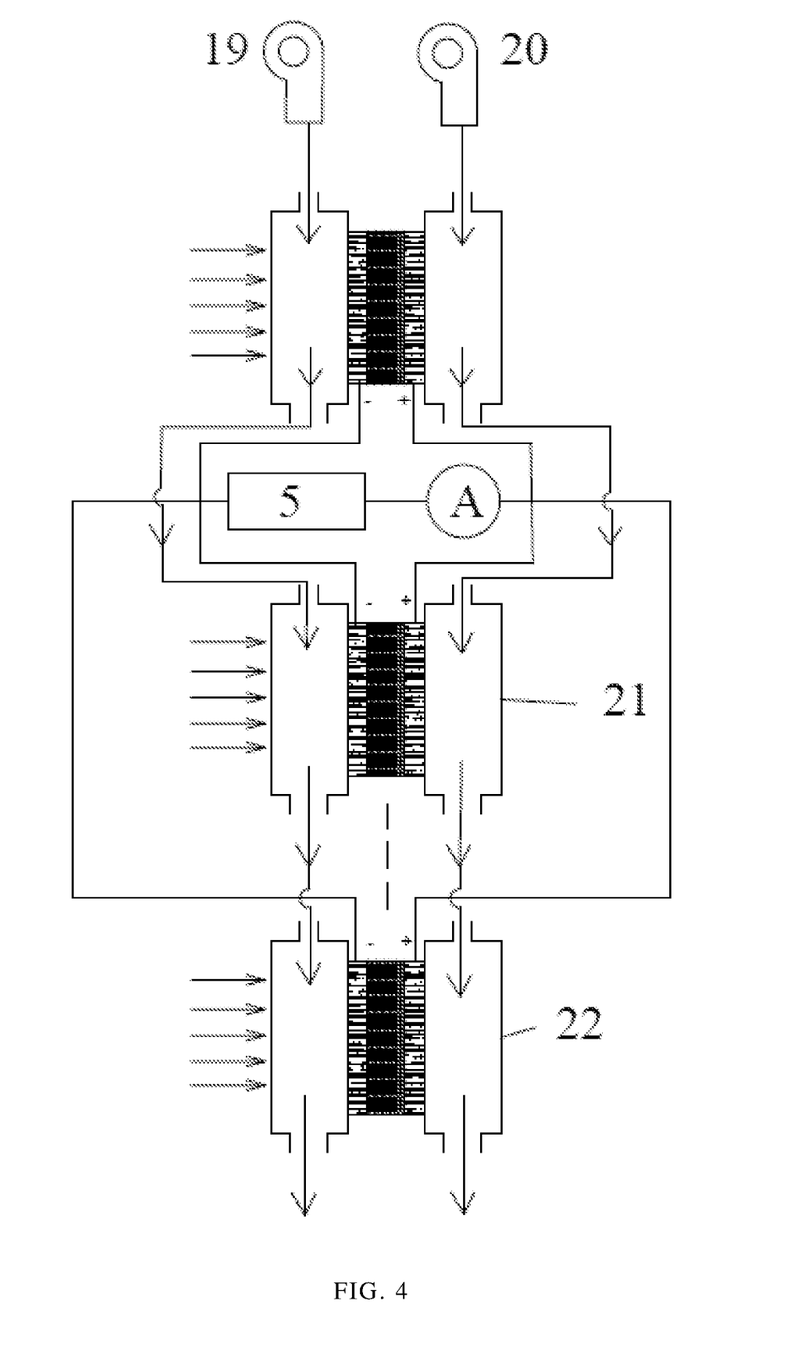
FIG. 4 is a schematic diagram of the photocatalytic power generation apparatus depending on the ambient humidity difference in the specific embodiment which employs multiple photocatalytic power generation units combined in a parallel mode.
Figure 5:
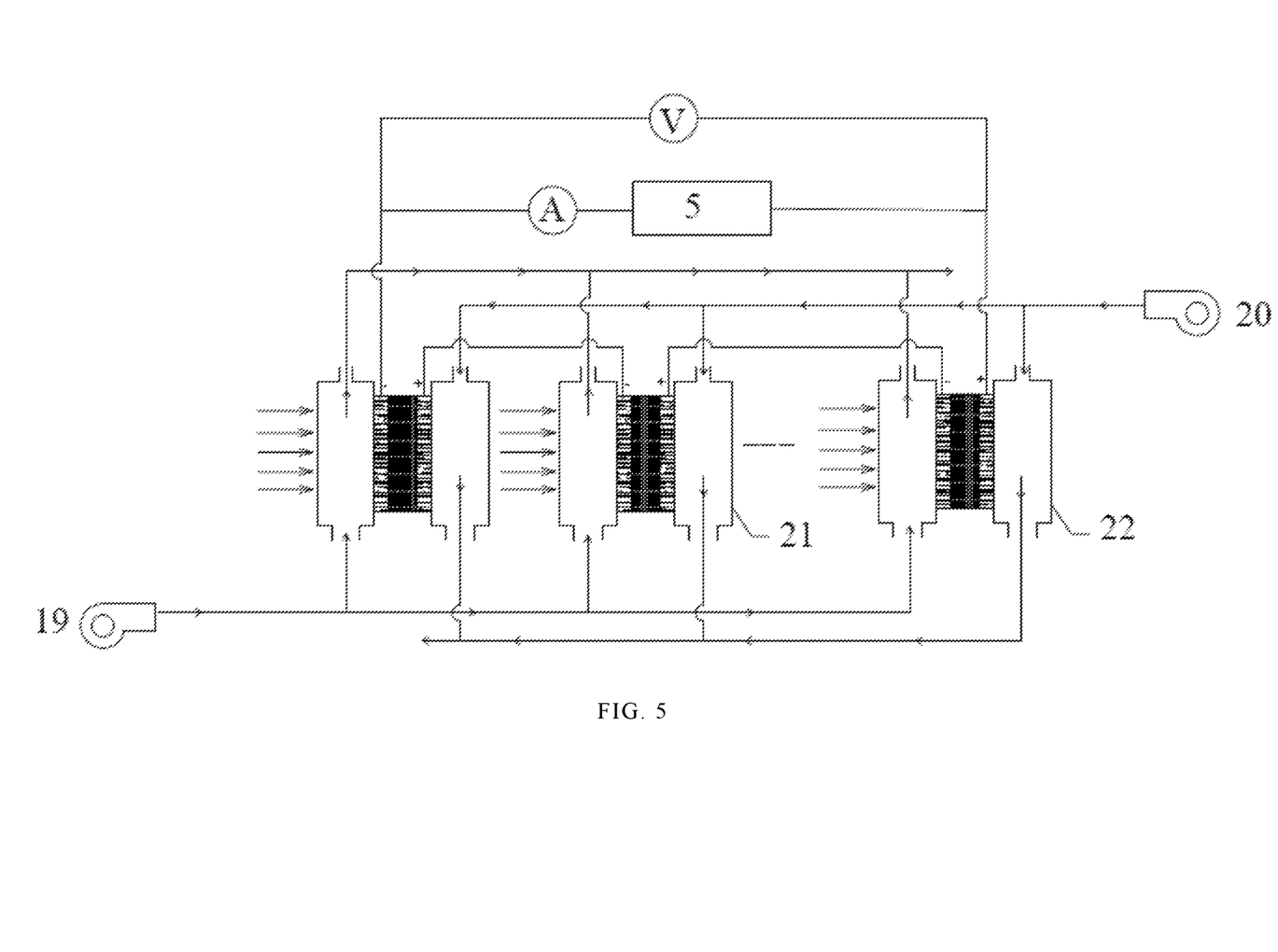
FIG. 5 is a schematic diagram of the photocatalytic power generation apparatus depending on the ambient humidity difference in the specific embodiment which employs multiple photocatalytic power generation units combined in a series mode.
Figure 6:
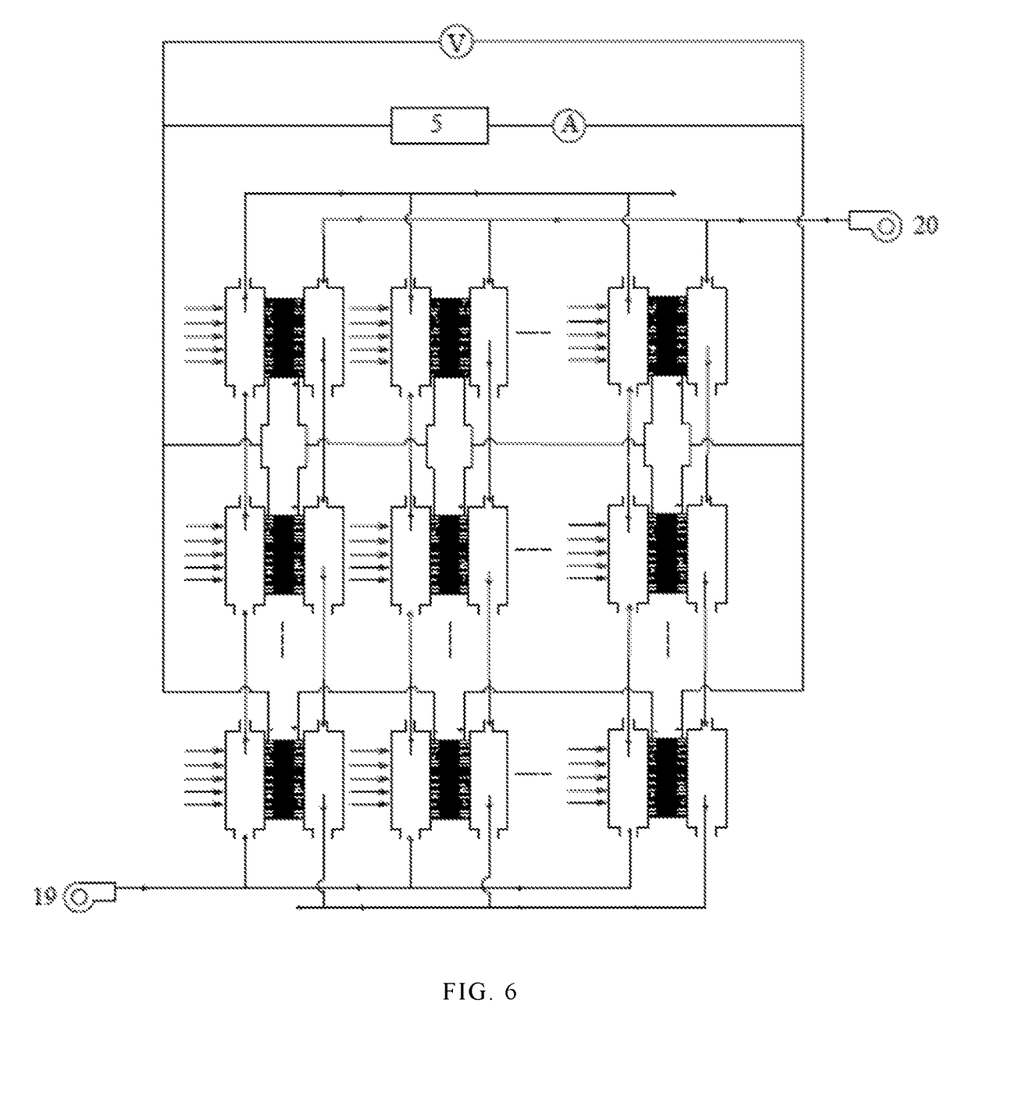
FIG. 6 is a schematic diagram of the photocatalytic power generation apparatus depending on the ambient humidity difference in the specific embodiment which employs multiple photocatalytic power generation units combined in a series/parallel composited mode.

FIG. 4, FIG. 5 and FIG. 6 are respectively schematic diagrams of multiple photocatalytic power generation units combined in a parallel mode, in a series mode and in a series/parallel composited mode.

The schematic diagram of adopting the multiple photocatalytic power generation units combined in the parallel mode is shown in FIG. 4. In the power generation process, a first variable frequency fan 19 and a second variable frequency fan 20 are turned on firstly, so that the high humidity air and the low humidity air respectively flow through a second photocatalytic power generation unit 21 to an nth photocatalytic power generation unit 22, and then merge into one stream and flow into the ambient air. Then a light irradiation assembly is turned on. Under the drive of the photocatalysis and the humidity difference, each power generation unit generates electric energy and the electric energy is collected into the power storage apparatus through a loop.

The schematic diagram of adopting the multiple photocatalytic power generation units combined in a series mode is shown in FIG. 5. Different from the parallel mode, the high humidity air and the low humidity air respectively flow in series through the second photocatalytic power generation unit 21 to the nth photocatalytic power generation unit 22, and then flow into the ambient air in the power generation process.

The schematic diagram of adopting the multiple photocatalytic power generation units combined in a series/parallel composited mode is shown in FIG. 6. From a horizontal view, the photocatalytic power generation units in each line are connected to each other in series. From a longitudinal view, the photocatalytic power generation units in each column are connected in parallel. Electric energy generated by each photocatalytic power generation unit is collected into the power storage apparatus through a loop.

The sunlight collection and emission assembly 4 is an assembly which is provided with reflection and refraction members, has a structure comprising a plane, a curved surface or a sawtooth surface, and is capable of collecting sunlight from an ineffective area to an effective area. The sunlight collection and emission assembly 4 is arranged on one side of the photocatalytic power generation unit near the anode gas channel 12, has a function of collecting sunlight, and is capable of irradiating the collected sunlight on the anode gas channel 2.

The above embodiments are preferred embodiments of the present invention, rather than all the embodiments, and are only intended to make further clear, complete and detailed description to the technical solutions of the present invention. Based on the above embodiments, all other embodiments obtained without going through any creative work from any changes, modifications, substitutions, combinations and simplifications made without departing from the spirit and principle of the present invention shall be equivalent substitutions and are included in the scope of protection of the present invention.

What is claimed is:

1. A photocatalytic power generation apparatus depending on an ambient humidity difference, characterized in that, the photocatalytic power generation apparatus comprises a photocatalytic power generation unit driven by a humidity difference, a power storage assembly and a sunlight collection and emission assembly;

the photocatalytic power generation unit driven by the humidity difference comprises an anode gas channel, a screen type photoelectric anode material, a moisture-permeable proton exchange membrane, a screen type cathode material and a cathode gas channel in sequence from one side to the other side; wherein the screen type photoelectric anode material, the moisture-permeable proton exchange membrane and the screen type cathode material together constitute an electrode assembly of the photocatalytic power generation unit;

the anode gas channel and the cathode gas channel are both provided with a gas inlet and a gas outlet; and the gas inlets of the anode gas channel and the cathode gas channel are both provided with a variable frequency fan;

the gas inlet of the anode gas channel is provided with a first air valve and a first temperature-humidity sensor, a first flow sensor is arranged inside the anode gas channel, and the gas outlet of the anode gas channel is provided with a second temperature-humidity sensor;

the gas inlet of the cathode gas channel is provided with a second air valve and a third temperature-humidity sensor, a second flow sensor is arranged inside the cathode gas channel, and the gas outlet of the cathode gas channel is provided with a fourth temperature-humidity sensor;

the screen type photoelectric anode material and the screen type cathode material are both porous screen structures; the screen type photoelectric anode material and the screen type cathode material respectively contain an anode photoelectric catalyst and a cathode catalyst; the screen type photoelectric anode material and the screen type cathode material are connected with the power storage assembly through wires, and an ammeter and a voltmeter are connected in a connecting circuit; and the sunlight collection and emission assembly is arranged on one side of the photocatalytic power generation unit near the anode gas channel, has a function of collecting sunlight, and is capable of irradiating the collected sunlight on the anode gas channel.

2. The photocatalytic power generation apparatus depending on the ambient humidity difference according to claim 1, characterized in that, a tube wall material of the anode gas channel is a light-permeable insulating and airtight material; and a tube wall material of the cathode gas channel is an insulating and airtight material.

3. The photocatalytic power generation apparatus depending on the ambient humidity difference according to claim 1, characterized in that, the moisture-permeable proton exchange membrane is a high-performance electrolyte membrane with a capability of selectively transmitting water molecules and hydrogen ions simultaneously; comprising a bipolar membrane or an amphoteric membrane.

4. The photocatalytic power generation apparatus depending on the ambient humidity difference according to claim 1, characterized in that, the screen type photoelectric anode material and the screen type cathode material are both prepared by closely attaching anode photoelectric catalyst or cathode catalyst particles to a surface of a metallic screen frame respectively by using a screen printing method, a transfer printing method or a spraying method.

5. The photocatalytic power generation apparatus depending on the ambient humidity difference according to claim 1, characterized in that, the anode photoelectric catalyst is a material with a catalytic photoelectric effect, a semiconductor material comprising $TiO_2$, $ZnO$ or $WO_3$, or a non-semiconductor material comprising a heteropolyacid; the cathode catalyst is a reduction reaction catalyst material capable of catalyzing electrons to react with oxygen and protons to generate water, and comprises noble metals Pt, Ir or Ru, or an alloy, a phosphide, a carbide or a load of one or more of the noble metals Pt, Ir and Ru.

6. The photocatalytic power generation apparatus depending on the ambient humidity difference according to claim 1, characterized in that, pipeline shapes of the anode gas channel and the cathode gas channel are prismatic, non-prismatic, vertical or curved.

7. The photocatalytic power generation apparatus depending on the ambient humidity difference according to claim 1, characterized in that, the sunlight collection and emission assembly is an assembly which is provided with reflection and refraction members, has a structure comprising a plane, a curved surface or a sawtooth surface, and is capable of collecting sunlight from an ineffective area to an effective area.

8. The photocatalytic power generation apparatus depending on the ambient humidity difference according to claim 1, characterized in that, a connected interface between the screen type photoelectric anode material and the moisture-permeable proton exchange membrane and a connected interface between the screen type cathode material and the moisture-permeable proton exchange membrane are both provided with a closely contacted point; when high humidity air is introduced into the anode gas channel and low humidity air is introduced into the cathode gas channel, the high humidity air in the anode gas channel approaches the contact point through an anode side porous screen structure, and under the irradiation of sunlight, water vapor in the air is photolyzed under an action of the anode photoelectric catalyst on the anode side porous screen structures to produce protons; meanwhile, the protons hydrate with water molecules in wet air at the anode side to form hydronium ions; at the same time, the low humidity air is introduced into the cathode gas channel, and the moisture-permeable proton exchange membrane generates a humidity difference from a high humidity side to a low humidity side, and the hydronium ions pass through the moisture-permeable proton exchange membrane and move to the cathode side under the drive of the humidity difference; and directional movement of the hydronium ion makes electrons produced by a photocatalytic reaction move correspondingly to produce a current and generate a power generation effect.

9. The photocatalytic power generation apparatus depending on the ambient humidity difference according to claim 8, characterized in that, the air flows in the anode gas channel and in the cathode gas channel in a concurrent flow mode, a countercurrent flow mode or a cross flow mode.

10. The photocatalytic power generation apparatus depending on the ambient humidity difference according to claim 1, characterized in that, one or more than one photocatalytic power generation unit driven by the humidity difference are provided, and the multiple photocatalytic power generation units driven by the humidity difference are combined in a series mode, a parallel mode, a cascade mode, a combined mode or a multistage mode.

* * * * *